UNITED STATES PATENT OFFICE.

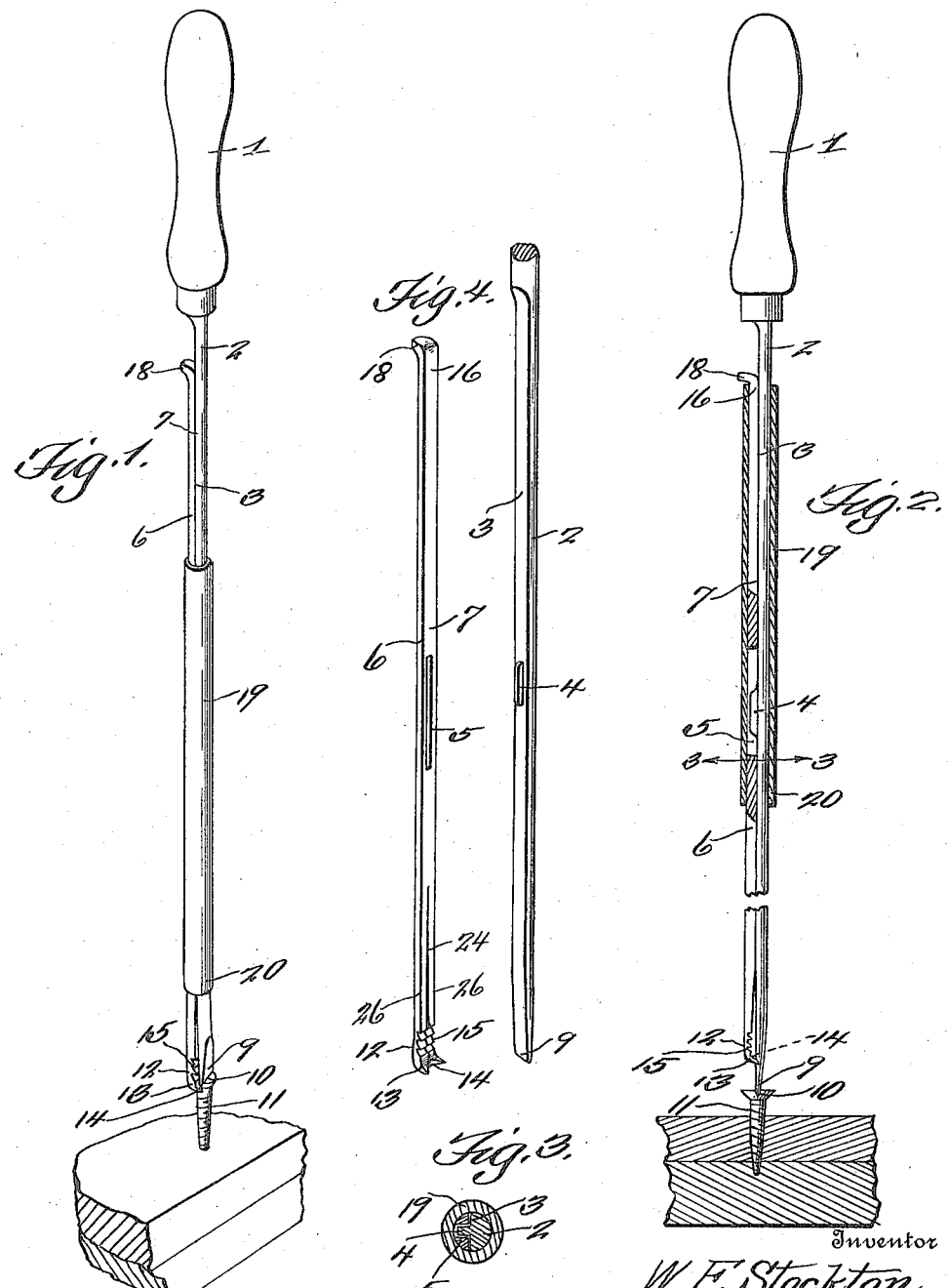

WILLIAM E. STOCKTON, OF ALEXANDRIA, INDIANA.

SCREW-HOLDING SCREW DRIVER AND STARTER.

1,161,357.  Specification of Letters Patent.  Patented Nov. 23, 1915.

Application filed March 11, 1915. Serial No. 13,647.

*To all whom it may concern:*

Be it known that I, WILLIAM E. STOCKTON, a citizen of the United States, residing at Alexandria, in the county of Madison and State of Indiana, have invented a new and useful Screw-Holding Screw Driver and Starter; and I do hereby declare the following to be a full, clear, and exact description of the invention, such as will enable others skilled in the art to which it appertains to make and use the same.

This invention relates to a new and useful screw holding screw driver and starter, and as an object of the invention it is the aim to provide a device of this nature, whereby a screw may not only be started, but after the screw has partially reached home, clamping means (which is carried by the screw driver) may be released, and by means of the same screw driver, the screw may be completely forced home.

One of the features of the invention is the provision of a screw driver shank having a flat surface provided with an elongated rib, which engages a slot of a clamping strip, there being a clamping sleeve telescoping the strip and the shank, to clamp the lower end (which is angular to receive and coöperate with the screw, which is engaged by the lower end of the screw driver shank) of said strip in coöperation with the screw and the lower end of the screw driver shank, to hold the screw while starting the same. After the screw has been driven almost home, the sleeve is moved rearwardly on the shank, so that one end will contact with a laterally extending lip of the strip, to cause the strip to move in the direction of the handle of the screw driver, thereby releasing the clamping end of the strip.

In practical fields the details of construction may necessitate alterations, falling within the scope of what is claimed.

The invention comprises further features and combination of parts, as hereinafter set forth, shown in the drawings and claimed.

In the drawings, Figure 1 is a view in perspective showing the screw holding screw driver in the act of starting a screw. Fig. 2 is a view showing the driver in a position after having partially driven the screw home, the clamping strip having been released and the sleeve having been moved toward the handle. Fig. 3 is a transverse sectional view. Fig. 4 illustrates views of the screw driver shank and the clamping strip.

Referring more particularly to the drawings, 1 designates the handle provided with a screw driver shank 2, which is constructed semi-circular in cross section, thereby necessarily providing the same with a longitudinally extending flat surface 3, substantially midway of the length of which an elongated rib is provided. This rib 4 engages an elongated slot 5 of a clamping strip 6, which is also semi-circular in cross section as shown, thereby forming the same with a longitudinally extending flat surface 7, which engages the flat surface of said shank. One end of the shank is provided with a wedge-shaped screw engaging end 9 to engage a slit or recess 10 of a screw 11, in order to turn the screw. It will be noted that the rib of the shank is shorter than the slot of the clamping strip, so that the strip may have a slight longitudinal movement. The end portion 12 of the clamping strip 7 is provided with an angular end 13, which is recessed at 14, to engage the shank of the screw immediately beneath the head thereof. The lower portion of the clamping strip on its flat surface adjacent the angular end is provided with a series of notches 15, any one of which is engaged by the circumferential edge of the head of the screw, not only to assist in preventing wabbling or displacement of the screw relative to the strip and the screw engaging end of the shank, but also to hold the head in its proper position with relation to the angular end 13 of the strip. The end portion 16 of the strip is constructed with a laterally extending lip 18, the purpose of which will appear later. A clamping sleeve 19 is provided for holding and clamping the strip in its adjusted positions. To assemble the device in the manner shown in Fig. 1, the strip is first inserted in the sleeve, until the end 20 of the sleeve contacts with the angular end 13. The engagement of the end 20 of the sleeve with said angular end is maintained until the shank is inserted telescopically through the sleeve with the flat surface of the shank adjacent the flat surface of the strip sufficiently until the rib of the shank is received in said slot, then the device is ready for use.

To start a screw, the same is positioned so that the screw engaging end of the shank will engage the slot of the screw head, with the angular end 13 under the head of the screw, the circumferential edge of the head engaging one of the notches adjacent the angular end. The sleeve is then telescopically moved, thereby drawing the end portion (which is provided with the angular end 13) of the strip toward the screw engaging end of the shank, thereby clamping the screw. The screw while in this position is driven almost home, then the sleeve is moved in the opposite direction until it contacts with the lift of the strip, in which case the angular end is released from engagement with the screw. The screw may then be screwed completely home. When the sleeve contacts with the lift a partial longitudinal movement is imparted to the strip.

The strip 6 from the end portion 13 is slitted as shown at 24 partially, so that the opposite portions 26 may spread, when receiving a larger screw shank than that which is shown.

The invention having been set forth, what is claimed as new and useful is:—

In combination with a screw driver having a shank and a strip, said strip and shank having engaging flat surfaces and provided with an interengaging recess and rib connection, the recess being of greater length than the rib, the shank having a screw engaging end and the strip having means at one end to hold the screw in engagement with the screw engaging end of the shank, of a sleeve telescoping the strip and the shank to clamp the strip to the shank.

In testimony whereof I have signed my name to this specification in the presence of two subscribing witnesses.

WILLIAM E. STOCKTON.

Witnesses:
MATTHEW SULLIVAN,
JOHN T. REESE.

Copies of this patent may be obtained for five cents each, by addressing the "Commissioner of Patents, Washington, D. C."